United States Patent
Steinmann (12) 
(10) Patent No.: US 6,651,348 B1
(45) Date of Patent: Nov. 25, 2003

(54) DRILL POWERED RECIPROCATING SAW

(76) Inventor: Lance R. Steinmann, 4824 West Ave., M-10, Quartz Hill, CA (US) 93536

( * ) Notice: Subject to any disclaimer, the term of this patent is extended or adjusted under 35 U.S.C. 154(b) by 0 days.

(21) Appl. No.: 09/100,918

(22) Filed: Jun. 19, 1998

(51) Int. Cl.[7] .................................................. B27B 3/26
(52) U.S. Cl. ............................. 30/392; 30/500; 408/21
(58) Field of Search ........................... 30/182, 187, 392, 30/393, 394, 210, 216, 217, 219, 220, 192, 500, 121, 122; 173/48, 174, 117; 83/749, 500, 572; 408/20, 21

(56) References Cited

U.S. PATENT DOCUMENTS

| | | | | |
|---|---|---|---|---|
| 2,793,661 A | * | 5/1957 | Olson | 30/392 |
| 4,924,578 A | * | 5/1990 | Chagnon et al. | 30/500 |
| 5,511,912 A | * | 4/1996 | Ellerbrock | 30/392 |
| 5,607,265 A | * | 3/1997 | Lane | 30/392 |
| 5,755,293 A | * | 5/1998 | Bourke | 173/29 |

* cited by examiner

Primary Examiner—Kenneth E. Peterson
Assistant Examiner—Omar Flores-Sánchez
(74) Attorney, Agent, or Firm—Stout, Uxa, Buyen & Mullins, LLP (57) ABSTRACT

A drill powered reciprocating saw including a safety gear assembly which disengages the saw's drive mechanism should the operator lose his or her grip on the saw housing. The gear assembly includes a motor drive shaft that is connected to an electric drill and which drives a jackshaft by means of a pair of interlocking gears. At rest, the drive shaft is biased by a spring to a position where the gears are not in contact with each other. When the operator pulls the saw housing toward the drill, the spring is compressed and the gears are engaged, thus allowing the saw to operate. Should the operator lose his or her grip on the housing, the spring biases the drive shaft back to its original position, thereby disengaging the gears.

22 Claims, 11 Drawing Sheets

DRILL POWERED RECIPROCATING SAW

BACKGROUND OF THE INVENTION

1. Field of the Invention

The present invention relates to an attachment for power tools and, in particular, to a device for actuating a reciprocating saw from a hand drill.

2. Description of the Related Art

Reciprocating saws are frequently used by contractors and the like for various cutting applications. Unfortunately, such saws are typically heavy and inconvenient to operate. In order to reduce the inconvenience associated with these saws, a variety of attachments have been developed for converting a rotary power tool, such as a drill, into a reciprocating saw. However, many of these attachments would require a power tool having a front portion specially shaped for receiving the attachment. Moreover, most reciprocating saw attachments are connected to the power tool by a rotating spindle. The rotation of the spindle makes it necessary for the operator to grip the saw attachment during operation. Should the operator loose his or her grip, the attachment will rotate in an unrestrained fashion, thereby potentially causing an injury.

Therefore, there is a need for a drill powered reciprocating saw having an automatic safety mechanism that will disengage the saw's drive mechanism and prevent the saw from rotating should the operator loose his or her grip on the saw housing, or should the drill be activated without the saw housing being gripped by the operator.

U.S. Pat. No. 1,793,053 discloses a saw which attaches to a potable hand tool, such as a drill. The saw uses a gear and belt drive mechanism to convert the rotary motion of the drill into reciprocating motion.

U.S. Pat. No. 2,240,755 discloses a power tool using a gearing mechanism to convert the rotary motion of a drill to a reciprocating motion.

U.S. Pat. No. 2,621,685 discloses a hand carried powered tool which uses a gear and flywheel mechanism to convert the rotary motion of a motor into reciprocating motion for a saw blade. The tool includes a work-rest for providing support against a work surface.

U.S. Pat. No. 2,631,619 discloses a reciprocating saw tool attachment which converts the rotary motion of a drill into a reciprocating motion for driving a saw blade. The rotating parts are positioned at a maximum distance from the reciprocating spindle to give the device the maximum degree of eccentricity with respect to the axis. This arrangement minimizes the force necessary to hold the saw and prevents rotation of the housing should the saw be released from the operator's hands.

U.S. Pat. No. 2,793,661 discloses a power driven reciprocating saw unit for converting a power drill into a saw. The device converts the rotary motion of the drive shaft into a reciprocating motion by means of a pivoting cylinder that is attached to the-drive shaft.

U.S. Pat. No. 3,260,289 discloses a saber saw attachment for a power tool, such as a hand drill. A rotating shaft is attached to a piston at one end, and to the drill drive shaft at the other end. The shaft has a circumferential groove for receiving a ball bearing. As the shaft is rotated, the groove and ball bearing cause the shaft to reciprocated back and forth, thereby driving the piston.

U.S. Pat. No. 3,585,719 discloses a power tool for converting the motion of a rotary power source, such as a drill, into a reciprocating motion. The device can hold a variety of different cutting blades including hacksaw blades and edge trimmers. A rotating power shaft has inclined wobble plate that is connected to a reciprocating spindle. The entire tool is rotatable 360 degrees in relation to the rotary power source.

U.S. Pat. No. 3,876,015 discloses a power tool attachment that converts rotary to reciprocating motion for portable power tools. The attachment is secured to the power tool by means of an adaptor lock plate that is attached to the front of the power tool.

U.S. Pat. No. 4,841,643 shows a drill powered saber saw comprising a stationary support for supporting a power drill, and a flexible power transmission cable for connecting the saber saw attachment to the drill.

U.S. Pat. No. 4,494,463 discloses a sawing device attachable to regular electric drill comprising a spiral gear drive mechanism which converts the rotary motion of the drill into reciprocating motion.

U.S. Pat. No. 5,050,307 discloses a wobble plate drive that is mounted on a rotating shaft and has a drive arm engaging a reciprocating spindle so as to restrain the spindle from rotation.

U.S. Pat. No. 5,566,458 discloses a clutch mechanism for reciprocating saws comprising a spring biased gear which provides slippage between the motor and the drive shaft if there is binding of the reciprocating spindle.

U.S. Pat. No. 5,595,250 discloses a drill accessory for converting a power drill into a reciprocating saw having a blade which can be adjusted for several different cutting depths.

U.S. Pat. No. 5,607,265 discloses a reciprocating attachment for hand drills. The reciprocating attachment uses a grooved shaft for changing the rotation of the shaft of the drill to a reciprocating motion necessary to power a saw blade.

None of the above inventions and patents, taken either singularly or in combination, is seen to describe the instant invention as claimed. Thus a drill powered saw solving the aforementioned problems is desired.

SUMMARY OF THE INVENTION

In view of the foregoing limitations of the drill powered reciprocating saws described in the prior art, the present invention provides an improved reciprocating saw having an automatic safety mechanism that will disengage the saw's drive mechanism and prevent the saw from rotating should the operator loose his or her grip on the saw housing, or should the drill be activated without the saw housing being gripped by the operator.

The invention comprises a reciprocating saw having a housing that is ergonomically configured to be gripped by a person's hand. A handle is rotatably attached to the housing and may be rotated around the housing axis by loosening a clamp. A motor drive shaft for connecting to a power drill is mounted in the housing. The drive shaft is connected to a jackshaft by a safety gear assembly. One end of the drive shaft is attached to the housing by a spring and slide bearing which biases the drive shaft to a position where the gear assembly is no longer engaged, and therefore, no power is imparted to the jackshaft. The gear assembly is engaged by pulling the housing toward the drill along the axis of the drive shaft. When the gear assembly is engaged, the jackshaft drives a wobble plate which converts the rotational motion to reciprocal motion. The wobble plate is attached by a drive arm to a tubular spindle which drives a saw blade.

Accordingly, it is a principal object of the invention to provide a reciprocating saw that attaches to a power drill and converts the rotary motion of the drill into reciprocal motion.

It is another object of the invention to provide a drill powered reciprocating saw having a safety gear assembly which prevents the saw from rotating should the operator loose his or her grip on the saw housing.

It is a further object of the invention to provide a drill powered reciprocating saw a having a vibration insulating system which isolates the drive shaft from vibration caused by the saw's reciprocating action.

Still another object of the invention is to provide a drill powered reciprocating saw having an ergonomically shaped housing to provide a comfortable grip for the hand.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Shown in the various figures is a drill powered reciprocating saw 100 of the present invention. As seen in FIGS. 4–7, the saw 100 includes an ergonomically configured housing 110 which provides the operator with a secure grip and facilitates operation of the saw, as will be discussed below.

Figure 6A:
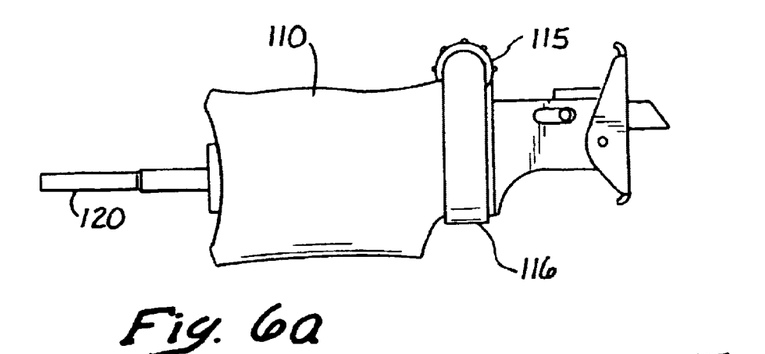
FIGS. 6a and 6b are side elevation views of the reciprocating saw.
Figure 6B:
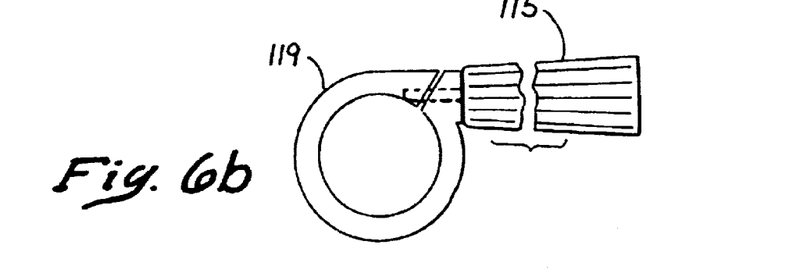
Figure 7A:
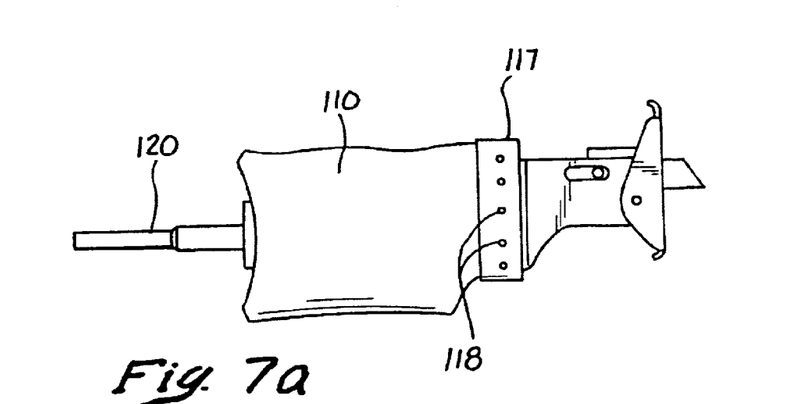
FIGS. 7a and 7b is a side elevation view of the reciprocating saw in accordance with a second alternative embodiment.
Figure 7B:
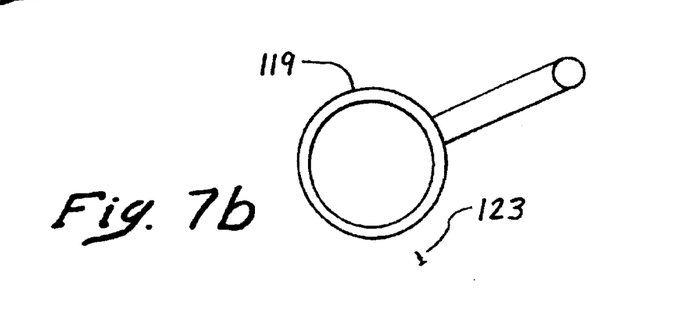

As shown in FIG. 6a, for example, the handle 115 is adapted to rotate about the housing's longitudinal axis, independently of the housing 110. This independent rotation may be achieved by placing (or forming) a circular track 116 around the housing 110 and mounting the handle 115 within the track, to thereby enable the handle 115 to rotate about the handle 110 in the track. The handle 115 preferably has a complementary circular assembly 119 for fitting into the circular track. 116, or the track 118 of FIG. 7a, for extra strength. As shown in FIG. 6b, the handle 115 can be tightened (screwed) into the circular assembly 119 to reduce the circumference of the circular assembly 119 and prevent rotation of the handle 115 relative to the circular assembly 119. In an alternative embodiment as shown in FIGS. 7a and 7b, the handle 115 can be rotated about the housing's longitudinal axis, independently of the housing 110, and locked to the housing 110 at any of a plurality of different rotational positions using a conventional locking means, such as a pin 123 inserted into aperture 118.

In yet another alternative embodiment, the handle 115 is fixed to the housing 110, and the housing 110 and the handle 115 can only rotate together 360 degrees around the housing's longitudinal axis (which is the axis of the motor drive shaft 120).

Figure 1:
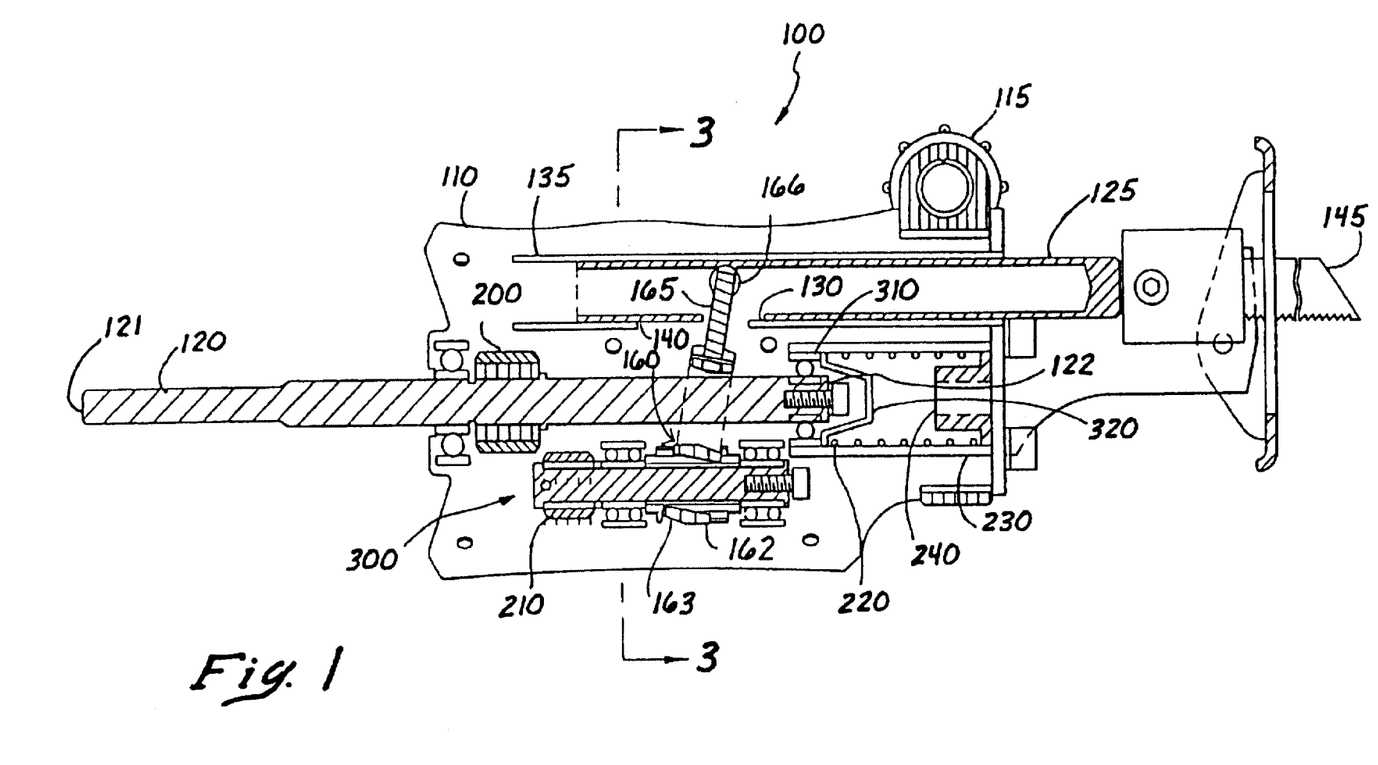
FIG. 1 is a side elevational view, in section, of a drill powered reciprocating saw of the present invention and showing the safety gear assembly in a disengaged position.
Figure 2:
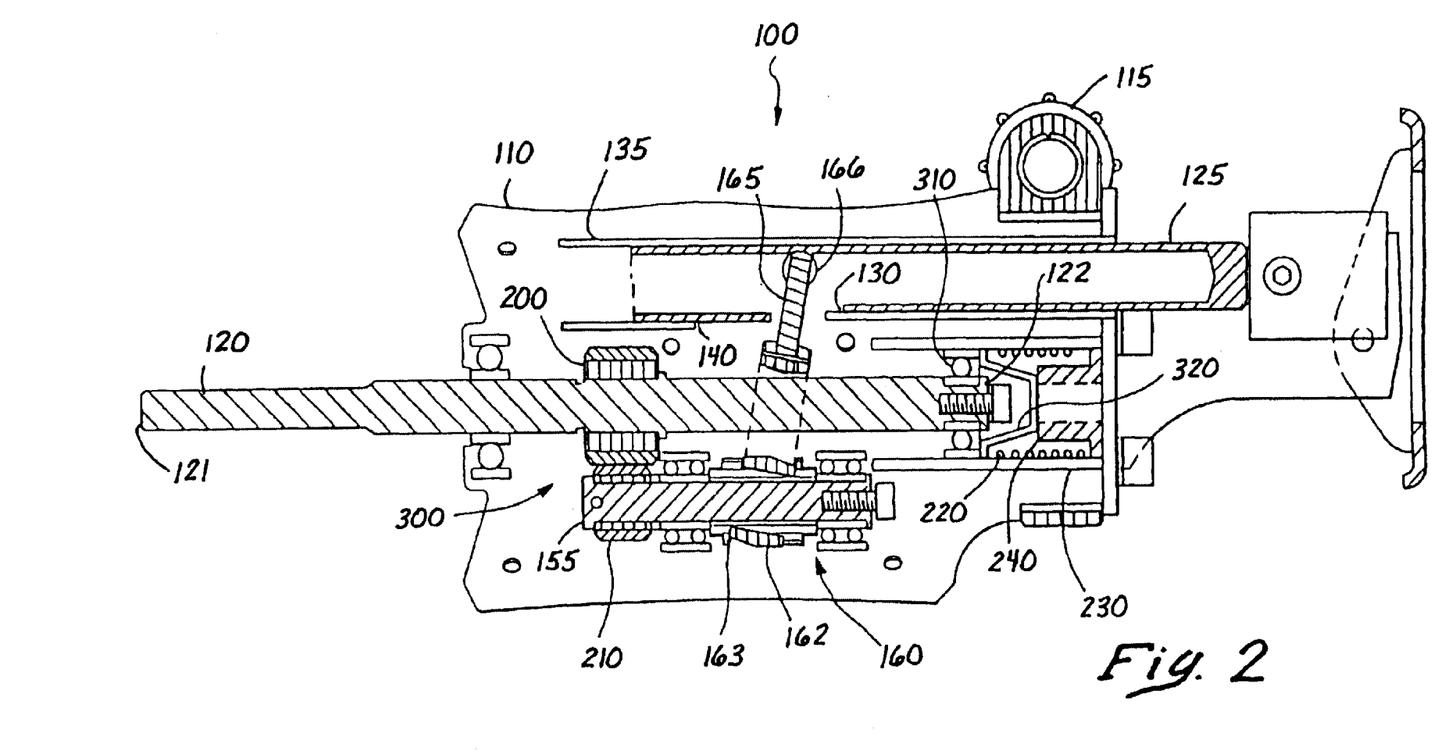
FIG. 2 is a side elevational view, in section, of the reciprocating saw showing the safety gear assembly in an engaged position.

As seen in FIG. 1 and FIG. 2, a motor drive shaft 120, having a first end 121, a second end 122, and a shaft axis extending there between. The first end 121 is preferably attached to an electric drill (not shown), and the motor drive shaft 120 is mounted in the housing 110. The drive shaft 120 drives a jackshaft 155 which s mounted in the housing 110 preferably parallel to the drive shaft 120. The drive shaft 120 and the jackshaft 155 are connected by a safety gear assembly 300. The safety gear assembly 300 includes a motor driveshaft gear 200 which is mounted on the drive shaft 120, and jackshaft gear 210 that is mounted on the jackshaft 155. The safety gear assembly may be a step-up system wherein said drive shaft gear 200 has a larger diameter than said jackshaft gear 210.

In the presently preferred embodiment, both the driveshaft gear 200 and the jackshaft gear 210 comprise helical gears. As presently embodied, the helical gears 200, 210 have standard 45 degree off-axis gear teeth. The implementation of both the driveshaft gear 200 and the jackshaft gear 210 as helical gears provides an optimal engagement of the driveshaft gear 200 and the jackshaft gear 210 as long as virtually any pressure is applied to the handle 110. Without the configuration of the driveshaft gear 200 and the jackshaft gear 210 as helical gears, the driveshaft gear 200 and the jackshaft gear 210 may be more likely to become disengaged as various pulling pushing and pressures are applied by a user to the handle 110 during cutting. The formation of the driveshaft gear 200 and the jackshaft gear 210 as helical gears preferably maintains a continuous engagement of the driveshaft gear 200 and the jackshaft gear 210 during cutting and/or as long as any pressure is the handle 110.

A spring guide sleeve 230 is mounted in the housing 110 opposite the electric drill, and supports the second end 122 of the drive shaft 120 in a slide bearing 310. A spring 220 is mounted inside the spring guide sleeve 230. A metal stop 320 is mounted onto the bearing 310 and prevents the end 122 of drive shaft 120 from contacting a rubber bumper 240 mounted inside the housing 110.

As seen in FIG. 1, the spring 220 biases the drive shaft 120 in a direction along the shaft axis so that the drive shaft gear 200 and the jackshaft gear 210 are disengaged from each other. In order to engage the safety gear assembly 300 as shown in FIG. 2, the operator must pull the housing 110 toward the drill, thereby compressing the spring 220 and moving the safety gear assembly 300 into an engaged position. When the safety gear assembly 300 is engaged, the metal stop 320 is pressed against the rubber bumper 240, thereby dampening the vibrations caused by the reciprocating spindle 125. Should the operator lose his or her grip on the housing while the saw 100 is not under a load, the spring 220 will cause the gear assembly 300 to disengage.

Figure 3:
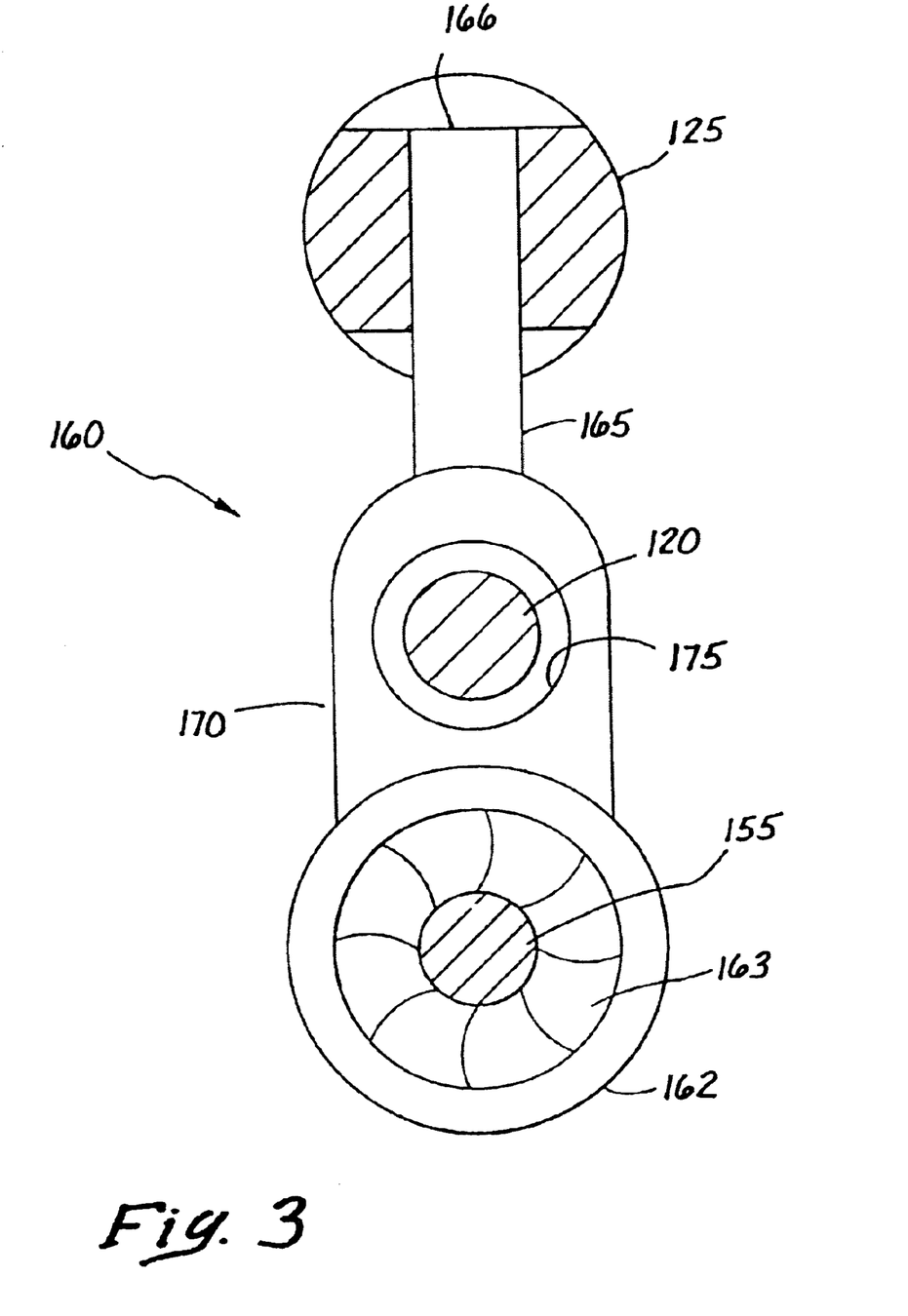
FIG. 3 is a sectional view taken along the line 3—3 of FIG. 1 showing the wobble drive assembly.
Figure 4:
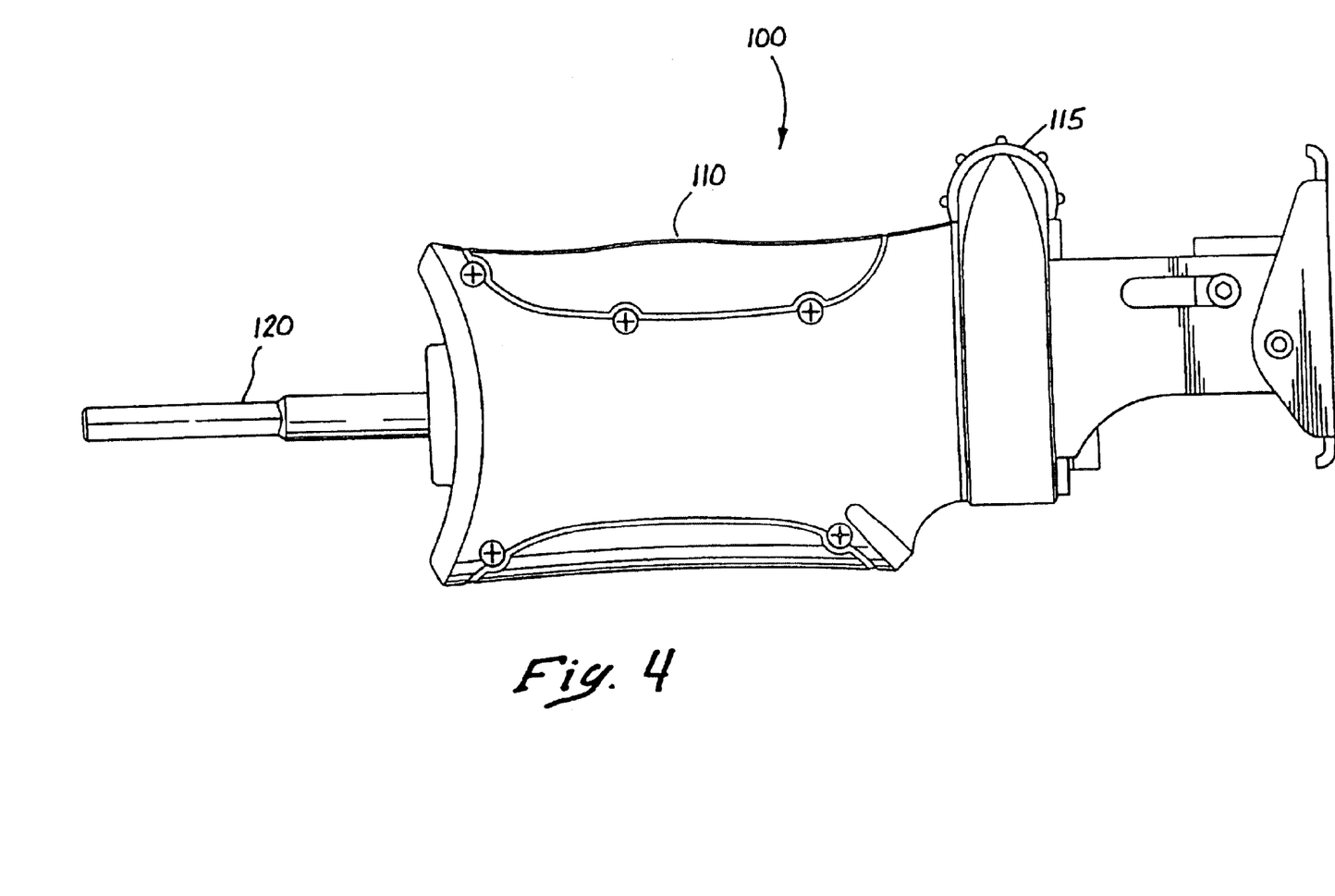
FIG. 4 is a side elevational view of the reciprocating saw.
Figure 5:
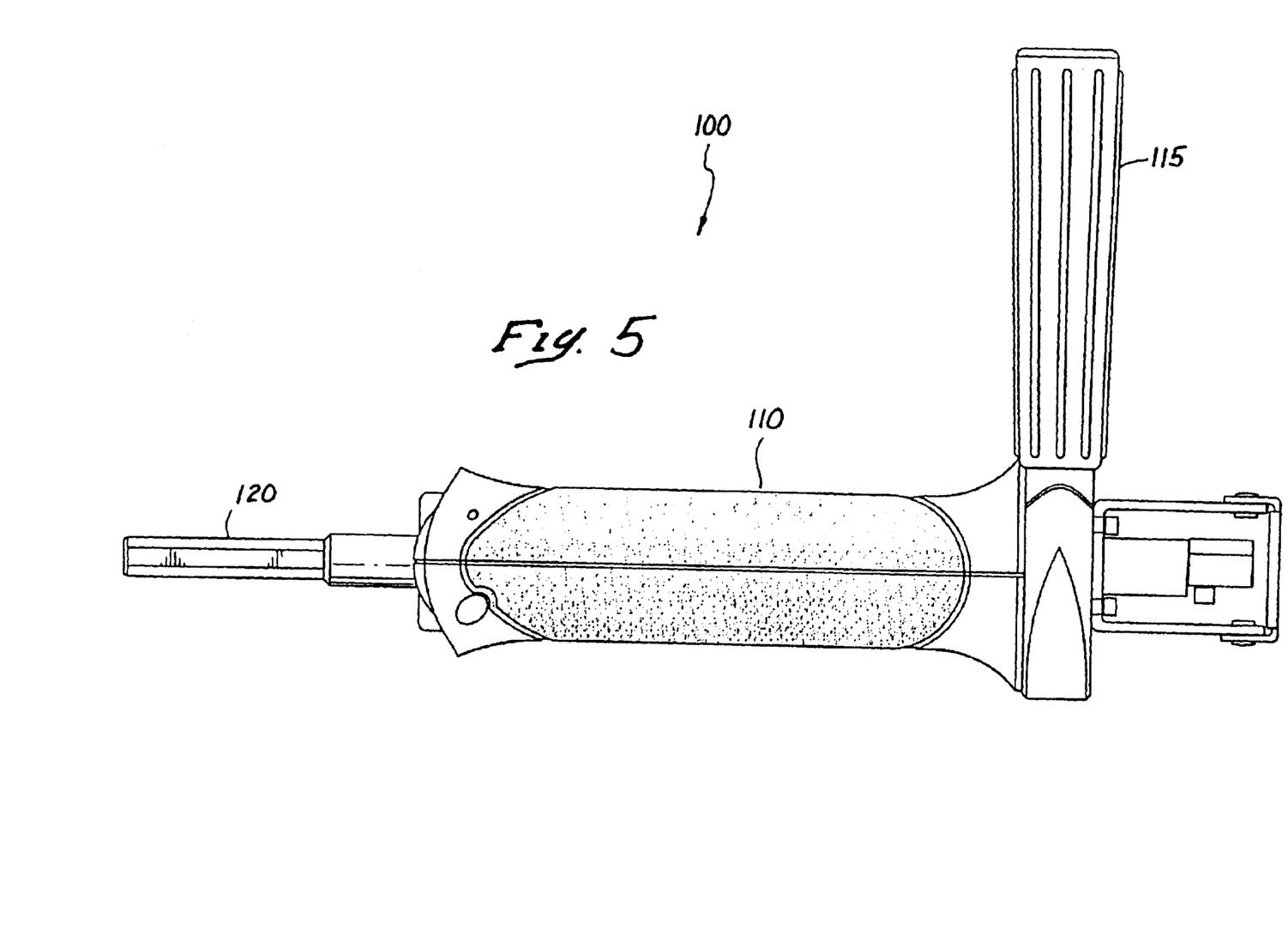
FIG. 5 is a top view of the reciprocating saw.

As seen in FIG. 1 and FIG. 2, the saw 100 includes a wobble drive assembly 160 for converting the rotary motion of the jackshaft 155 into reciprocating motion for driving a saw blade 145, which is held by a clamp attached to the end of the reciprocating spindle 125. The wobble drive assembly 160 includes a wobble plate 162 that is mounted on the jackshaft 155 by an input bearing 163. As best seen in FIG. 3, the wobble plate 162 is connected to a drive arm support 170, which has an opening 175 through which passes the drive shaft 120. This construction allows the drive shaft 120 to be anchored at its second end 122, while freely moving relative to the housing 110. A drive arm 165 is attached to the drive arm support 170 for driving a reciprocating tubular spindle 125.

As seen in FIG. 1 and FIG. 2, the spindle 125 is mounted in a spindle bearing 135. The spindle 125 has a longitudinal spindle slot 130 positioned on the side of the spindle closer to the drive shaft 120. The spindle bearing 135 has an axial slot 140 which is aligned with the spindle slot 130. The drive arm 165 projects through both the spindle slot 130 and the spindle bearing slot 140 and into the spindle 125, where the drive arm 165 is secured by a wrist pin 166.

Figure 8:
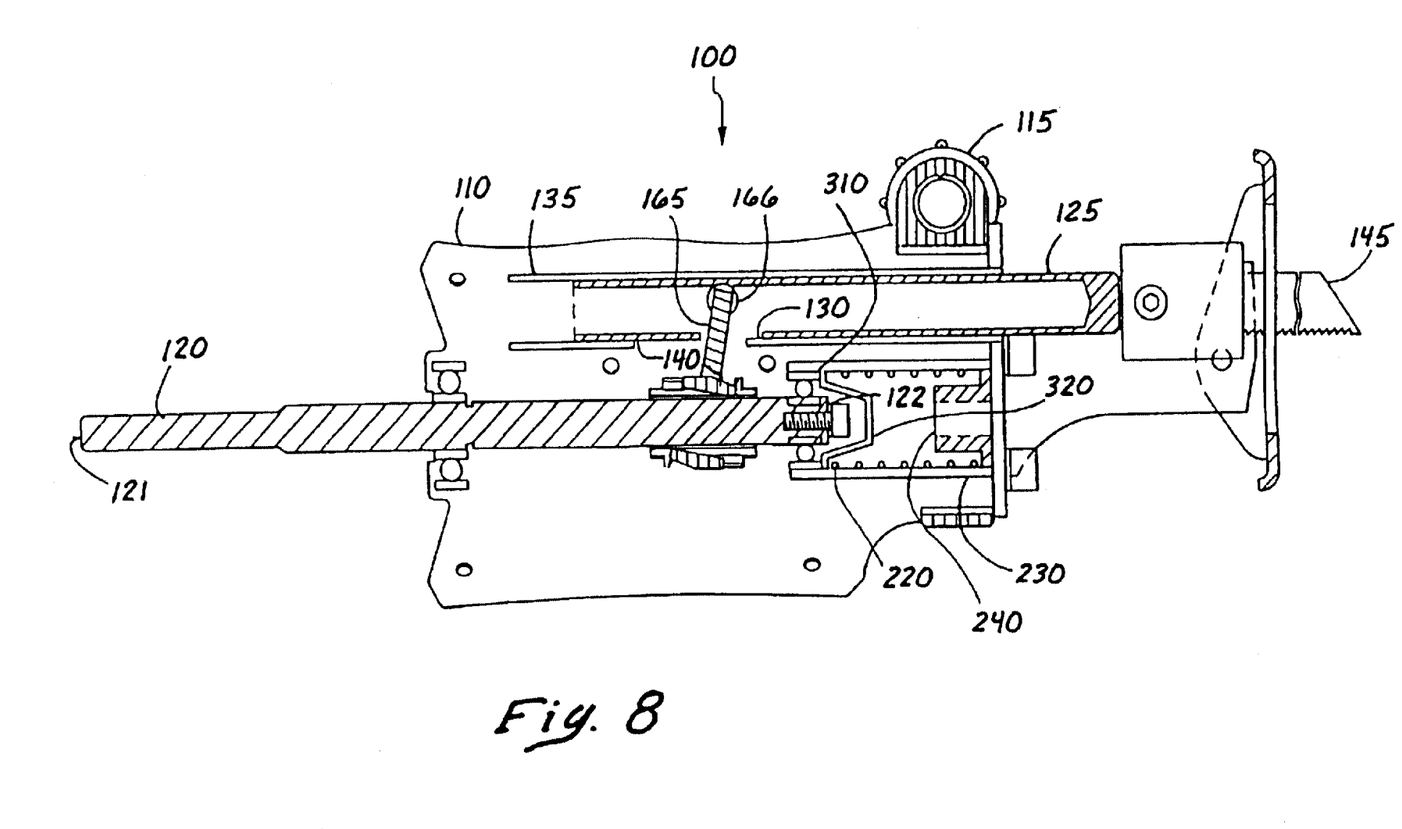
FIG. 8 shows an embodiment where the drive arm is connected to the motor drive shaft via a wobble plate.
Figure 9:
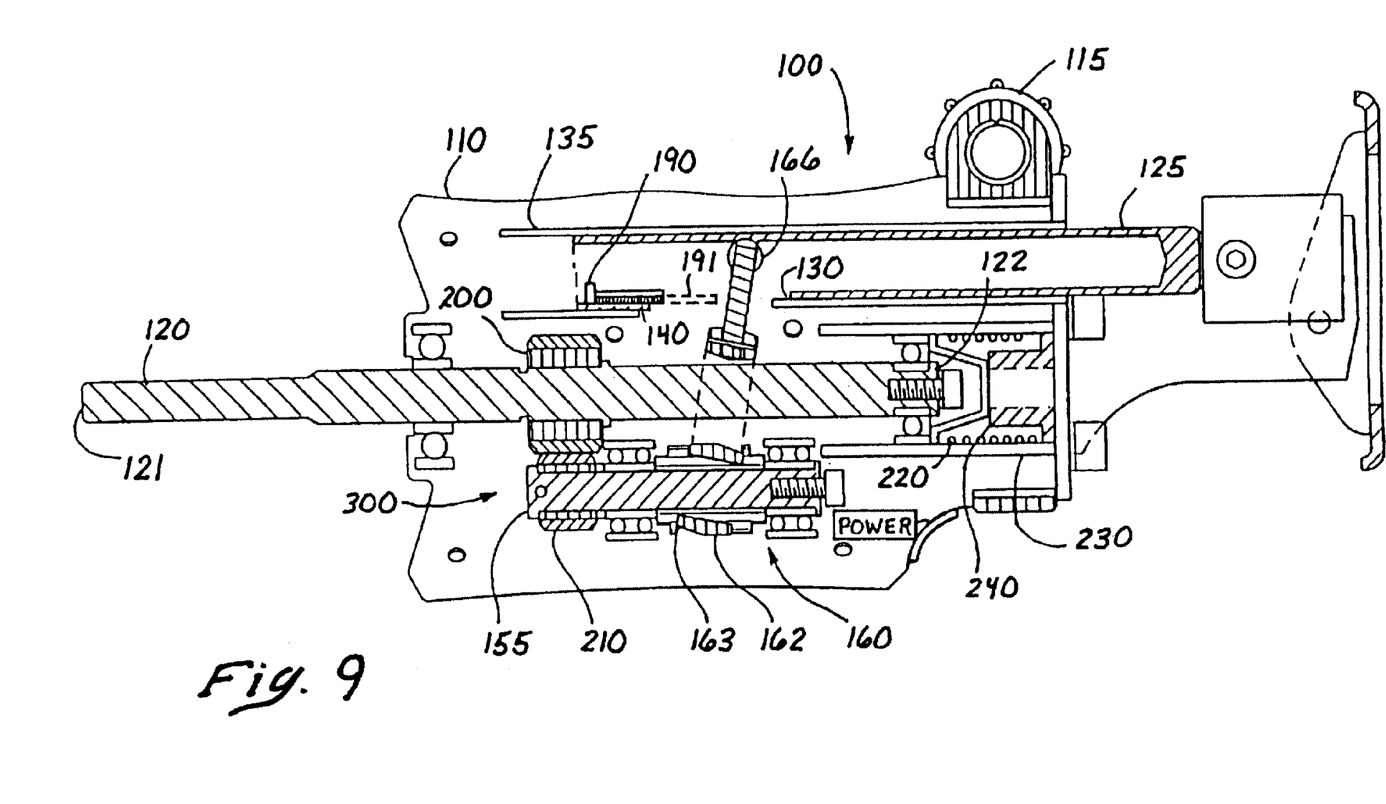
FIGS. 9 and 10 illustrate safety assemblies according to alternative embodiments.
Figure 10:
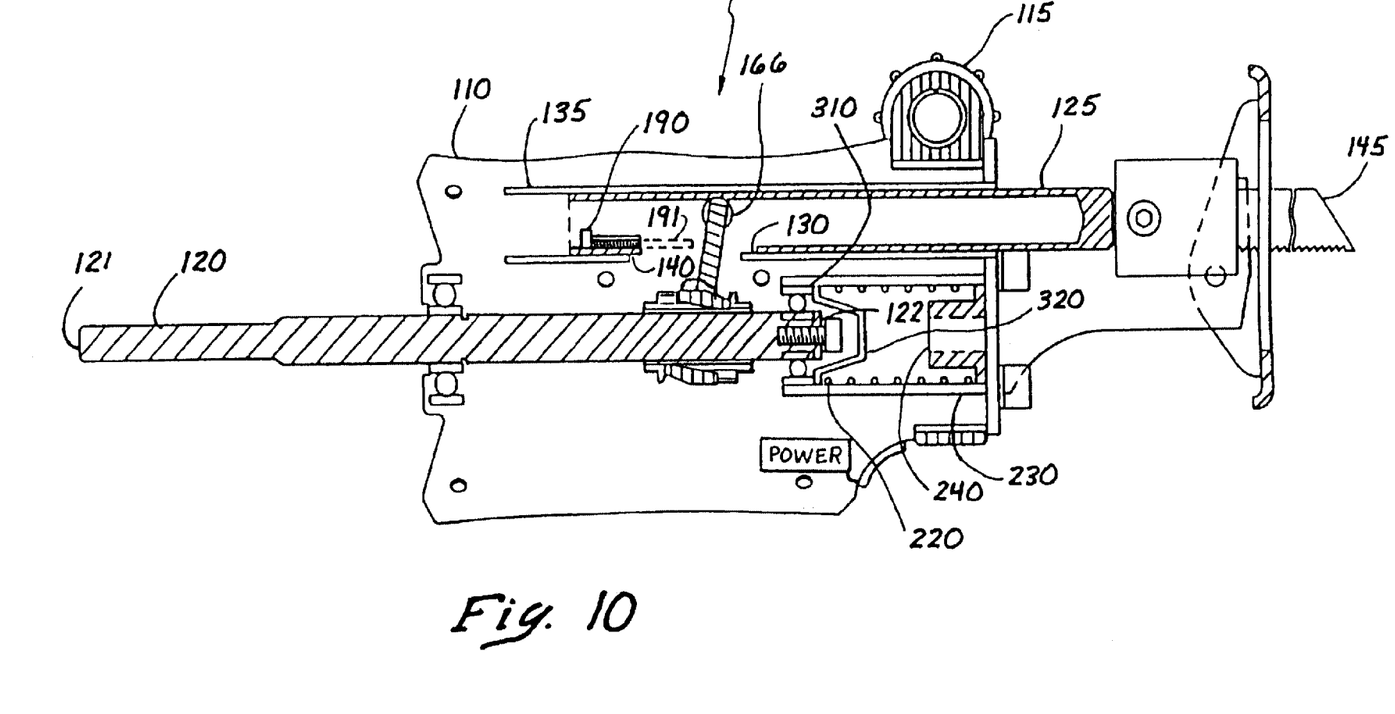

FIG. 8 shows an embodiment where the drive arm 165 is connected to the motor drive shaft 120 via a wobble plate 162. FIGS. 9 and 10 illustrate safety assemblies according to alternative embodiments wherein solenoids 190 are used to move movable members 191 in proximal and distal directions to change the size of the opening 175.

Figure 11:
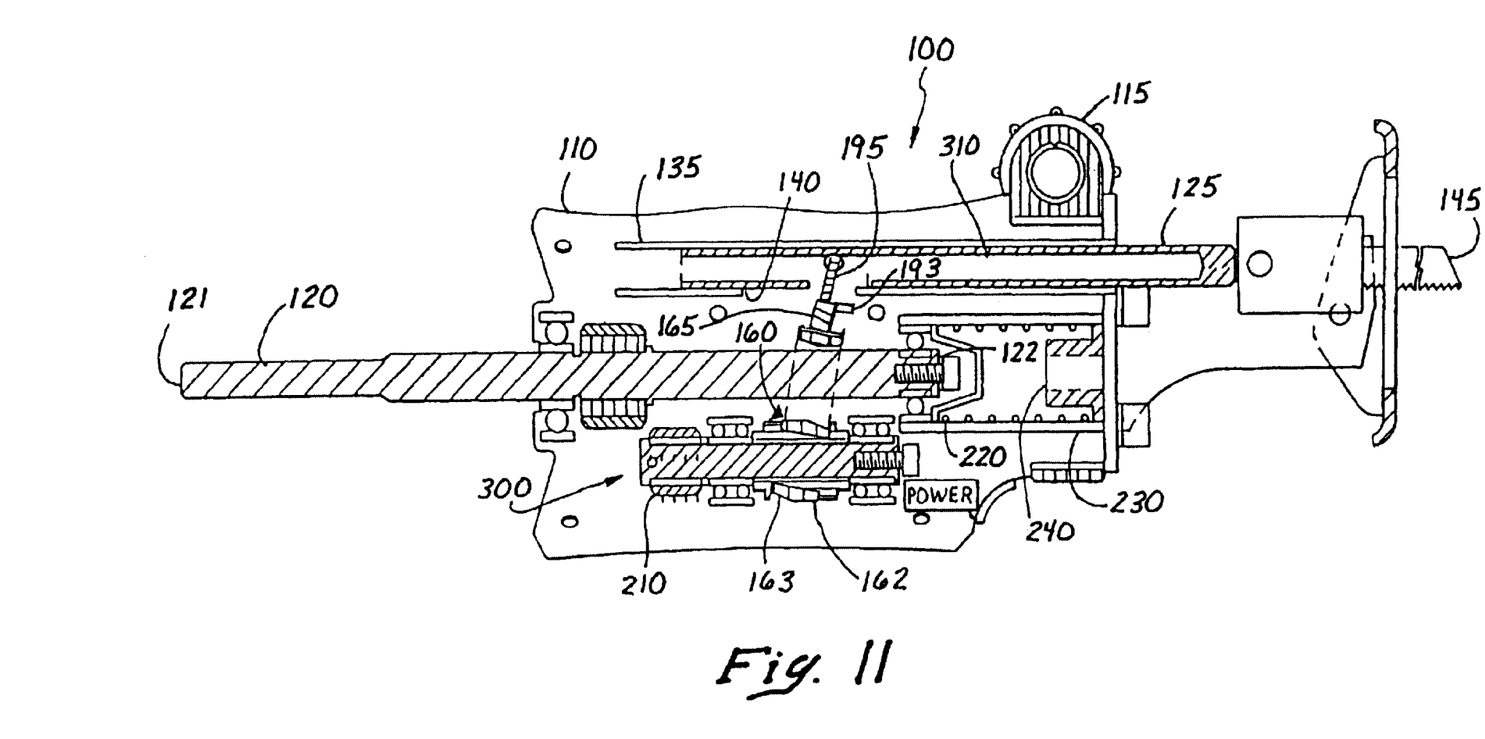
FIGS. 11 and 12 illustrate safety assemblies according to additional alternative embodiments.
Figure 12:
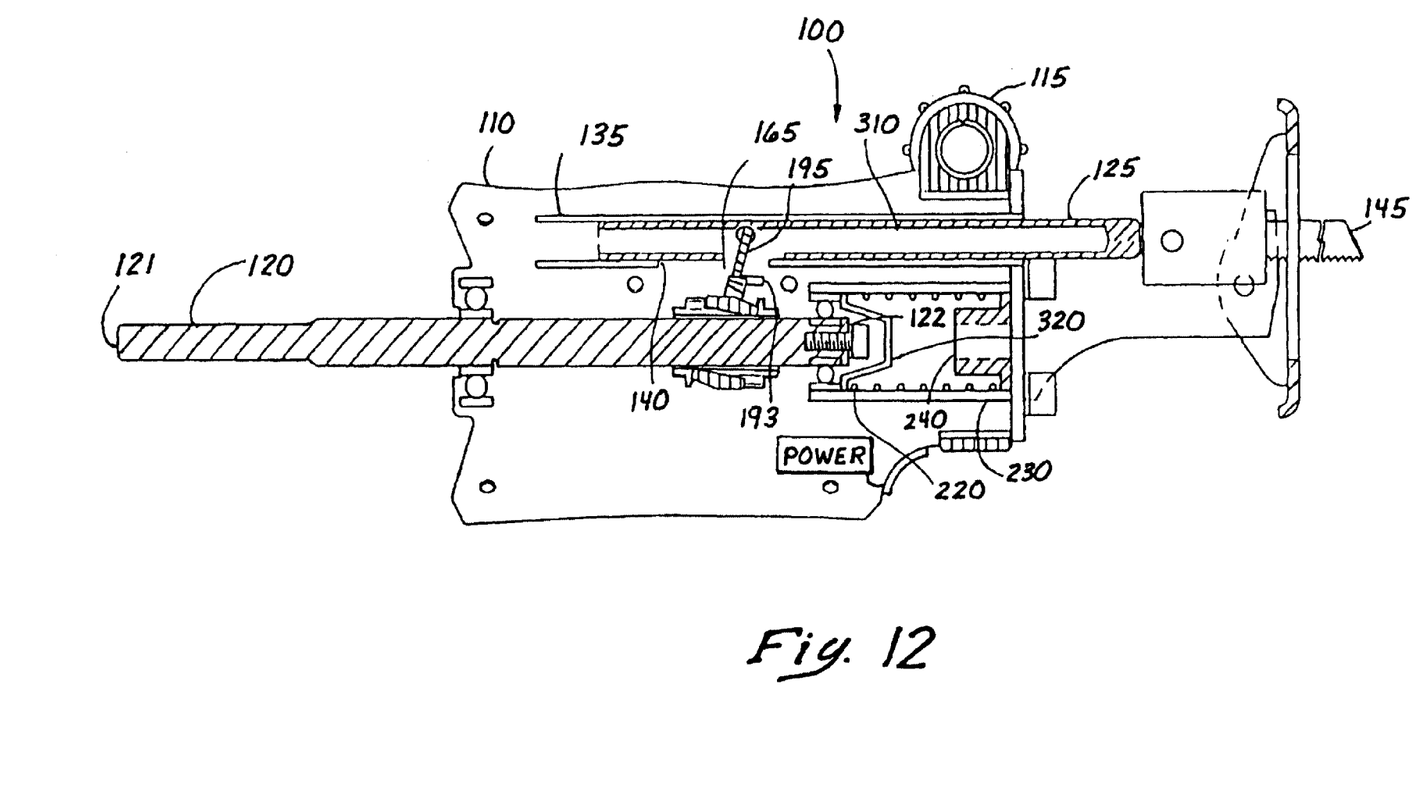

The solenoid-driven safety assemblies of FIGS. 9 and 10, and of FIGS. 11 and 12, require a power source (preferably a battery, shown in the figures as a "power" block). The power blocks are connected to triggers (shown in finger notch adjacent to "power" block) and are adapted to drive the solenoids to engage the reciprocating spindles 125 when the triggers are pressed by a finger of a user. The solenoid-driven safety assemblies may be used with or without the mechanical gear-driven safety assembly 220, 210. Additionally, the trigger may be placed on other places on the housing 110, such as on the handle 115. Alternatively, rotation of the handle 115 may operate as a trigger, or movement of the housing 110 may be configured to provide a trigger effect, with or without the safety gears 200, 210. In addition to the rotation of the handle 115, or the movement of the housing in a proximal or distal direction (relative to the motor drive shaft, for example) for providing a drive-disengagement safety assembly, either of these movements may be used in alternative embodiments for providing the electrical power to a power-driven tool. Other means are also possible for providing a drive-disengagement safety assembly. The solenoid 190 moves the movable member 191 in the distal direction to decrease the size of the opening 175 so that the drive arm 165 can drive the reciprocating spindle 125, and moves the movable member 191 in the proximal direction to increase the size of the opening 175 so that the drive arm 165 moves freely within the opening 175 without driving the reciprocating spindle 125.

FIGS. 11 and 12 illustrate safety assemblies according to additional alternative embodiments wherein solenoids 193 are used to move movable members 195 in extended and retracted directions to change the lengths of the drive arms 165. The solenoid 193 moves the movable member 195 in the extended direction to increase the length of the drive arm 165 and move the drive arm 165 into the opening 175, so that the drive arm 165 can drive the reciprocating spindle 125; and moves the movable member 195 in the retracted direction to decrease the length of the drive arm 165 so that the drive arm 165 moves freely outside of the opening 175 without driving the reciprocating spindle 125.

It is to be understood that the present invention is not limited to the embodiment described above, but encompasses any and all embodiments within the scope of the following claims.

What is claimed is:

1. A drill powered reciprocating saw comprising:
    a housing;
    a motor drive shaft for attaching to an electric drill, the motor drive shaft being rotatably mounted and axially reciprocable in said housing;
    a spindle mounted in said housing for moving in a reciprocating motion;
    a clamp attached to an end of said spindle for holding a saw blade;
    a jackshaft rotatably mounted in said housing;
    a wobble plate mounted on said second jackshaft and coupled to said spindle, said wobble plate being for converting rotational motion of said jackshaft to reciprocating motion of said spindle;
    a safety gear assembly operatively positioned between said motor drive shaft and said jackshaft, said safety gear assembly for disengaging said electric drill from said spindle by said axial reciprocation of said motor drive shaft between a first state wherein said jackshaft is in operable engagement with said motor drive shaft and a second state wherein said jackshaft is disengaged from said motor drive shaft.

2. The drill powered reciprocating saw according to claim 1, further comprising a spindle slide bearing mounted in said housing, and an axial slot in said spindle slide bearing, wherein said spindle is slidably mounted in said spindle slide bearing, wherein said wobble plate includes a drive arm which projects through said axial slot to drivingly engage said spindle and wherein said drive arm is constrained by said axial slot to motion in a plane including said spindle, said motor drive shaft and said jackshaft.

3. A drill powered reciprocating saw comprising:
    a housing having a front end, a rear end, and a longitudinal axis extending therebetween;
    a handle attached to said housing;
    a motor drive shaft for attaching to an electric drill rotatably mounted in said housing, said motor drive shaft defining a drive shaft axis and having a first end and a second end;
    a spindle mounted in said housing for moving in a reciprocating motion in a direction which is along a spindle axis and parallel to said drive shaft axis, said spindle having a longitudinal spindle slot therein on a portion of said spindle near said motor drive shaft;
    a jackshaft rotatably mounted in said housing parallel to said motor drive shaft, said jackshaft having a jackshaft axis;
    a wobble plate drive assembly comprising:
        a wobble plate for converting rotational motion of said jackshaft to reciprocating motion of said spindle, said wobble plate being mounted on said jackshaft by an input bearing and coupled to said spindle by a drive arm, wherein said drive arm projects through said longitudinal spindle slot and is attached to a portion of said spindle opposite said slot to drive said spindle by a wrist pin; and
        a drive arm support for connecting said wobble plate to said drive arm, wherein said drive arm support has an opening through which passes said motor drive shaft;

a safety gear drive assembly for interconnecting said motor drive shaft and said jackshaft, said safety gear drive assembly comprising:
   a motor drive shaft gear attached to said motor drive shaft;
   a jackshaft gear attached to said jackshaft;
   a spring slide bearing mounted in said housing for supporting said second end of said motor drive shaft;
   a stop attached to said second end of said motor drive shaft and slidably mounted within said spring slide bearing;
   a spring mounted in said spring slide bearing and biasing said motor drive shaft in a direction along said shaft axis so that said motor drive shaft gear and said jackshaft gear are disengaged when said spring is in a non-compressed position; and
   a motor drive shaft bumper mounted in said housing for isolating said motor drive shaft from vibrations generated by said reciprocating spindle.

4. The drill powered reciprocating saw according to claim 3, wherein said spring slide bearing is mounted in said housing at an end proximate said front end of said housing.

5. The drill powered reciprocating saw according to claim 3, wherein said spring is a helical spring.

6. The drill powered reciprocating saw according to claim 3, wherein, when said spring is compressed, said motor drive shaft gear and said jackshaft gear are engaged and said housing is positioned rearward along said drive shaft axis.

7. The drill powered reciprocating saw according to claim 3, wherein said motor drive shaft bumper is mounted in said housing, inside said spring slide bearing, and isolates said drive shaft from vibrations generated by said reciprocating spindle when said safety gear assembly is engaged.

8. The drill powered reciprocating saw according to claim 3, wherein said spindle is tubular.

9. The drill powered reciprocating saw according to claim 3, further comprising a spindle slide bearing mounted in said housing, and an axial slot in said spindle slide bearing, wherein said spindle is slidably mounted in said bearing, and said drive arm projects through said axial slot in said spindle slide bearing to drivingly engage said spindle and wherein said drive arm is constrained by said axial slot to motion in a plane including said spindle, said motor drive shaft and said jackshaft.

10. The drill powered reciprocating saw according to claim 3, wherein said safety gear drive assembly is a step-up system wherein said motor drive shaft gear has a larger diameter than said jackshaft gear.

11. A drill-powered reciprocating saw, comprising:
   a housing having a proximal housing end, a distal housing end, and a housing axis extending therebetween;
   a motor drive shaft having a rotational axis, the motor drive shaft being adapted to be connected to an electric drill and to receive rotational energy from the electric drill;
   a jackshaft operatively coupled to the motor drive shaft, the jackshaft including a jackshaft rotational axis and being adapted to receive rotational energy from the motor drive shaft, the jackshaft rotational axis being substantially parallel to the rotational axis of the motor drive shaft;
   a wobble plate drive assembly adapted to convert a rotational motion of the jackshaft into a reciprocating motion, the wobble plate drive assembly comprises an open area that is adapted to accommodate at least a part of motor drive shaft therethrough; and
   a reciprocating spindle disposed within the housing, the reciprocating spindle being adapted to be coupled to a saw blade at the distal housing end, the reciprocating spindle further being adapted to receive the reciprocating motion from the wobble plate drive assembly and to drive the saw blade with a reciprocating motion.

12. The drill-powered reciprocating saw as set forth in claim 10, wherein:
   the wobble plate drive assembly has a plane of reciprocating motion, which is defined as a plane in which the wobble plate drive assembly generally remains as the wobble plate drive assembly imparts reciprocating motion to the reciprocating spindle; and
   the rotational axis of the motor drive shaft lies within the plane of reciprocating motion of the axis of the wobble plate drive assembly.

13. The drill-powered reciprocating saw as set forth in claim 12, wherein the wobble plate drive assembly comprises an aperture that is adapted to accommodate the motor drive shaft therethrough.

14. The drill-powered reciprocating saw as set forth in claim 12, wherein:
   the drill-powered reciprocating saw further comprises a safety gear drive assembly, the safety gear drive assembly coupling the jackshaft to the motor drive shaft;
   the safety gear drive assembly comprises a motor driveshaft gear connected to the motor drive shaft and a jackshaft gear coupled to the jackshaft; and
   at least one of the motor driveshaft and the jackshaft is biased in a direction generally parallel to the housing axis, the biasing of the at least one of the motor driveshaft and the jackshaft biasing the motor driveshaft gear to be disengaged from the jackshaft gear.

15. The drill-powered reciprocating saw as set forth in claim 14, wherein both the motor driveshaft gear and the jackshaft gear comprise helical gears.

16. The drill-powered reciprocating saw as set forth in claim 15, wherein the motor drive shaft is biased in a direction along the housing axis in a direction from the housing distal end to the housing proximal end.

17. A drill-powered reciprocating saw, comprising:
   a housing having a proximal housing end, a distal housing end, and a housing axis extending therebetween;
   a motor drive shaft having a rotational axis and being axially reciprocable relative to said housing, the motor drive shaft being adapted to be connected to an electric drill and to receive rotational energy from the electric drill;
   a motion conversion assembly adapted to convert a rotational motion of the motor drive shaft into a reciprocating motion;
   a reciprocating spindle disposed within the housing, the reciprocating spindle being adapted to be coupled to a saw blade at the distal housing end, the reciprocating spindle further being adapted to receive the reciprocating motion from the motion conversion assembly and to to drive the saw blade with a reciprocating motion; and
   a power removal assembly coupled between at least one of: (a) the motor drive shaft and the motion conversion assembly and (b) the motion conversion assembly and the reciprocating spindle;
   wherein the power removal assembly is adapted to remove the application of reciprocating motion from the saw blade upon an occurrence of a predetermined condition by said axial reciprocation of said motor drive shaft.

18. The drill-powered reciprocating saw as set forth in claim 17, the motion conversion assembly comprises:

a jackshaft operatively coupled to the motor drive shaft, the jackshaft including a jackshaft rotational axis and being adapted to receive rotational energy from the motor drive shaft, the jackshaft rotational axis being substantially parallel to the rotational axis of the motor drive shaft; and a wobble plate drive assembly adapted to convert a rotational motion of the jackshaft into a reciprocating motion;

wherein the reciprocating spindle is adapted to receive the reciprocating motion from the wobble plate drive assembly and to drive the saw blade with a reciprocating motion;

the power removal assembly is adapted to couple the jackshaft to the motor drive shaft; and the power removal assembly is adapted to decouple the jackshaft from the motor drive shaft upon an occurrence of a predetermined condition.

19. The drill-powered reciprocating saw as set forth in claim 18, wherein the power removal assembly comprises:

a motor driveshaft gear connected to the motor drive shaft;

a jackshaft gear coupled to the jackshaft; and a biasing assembly adapted to bias the motor driveshaft and the jackshaft relative to one another in a direction generally parallel to the housing axis, the biasing of the at least one of the motor driveshaft and the jackshaft biasing the motor driveshaft gear to be disengaged from the jackshaft gear upon occurrence of the predetermined condition.

20. The drill-powered reciprocating saw as set forth in claim 19, wherein the predetermined condition comprises a user removing a hand from the housing of the drill-powered reciprocating saw.

21. The drill-powered reciprocating saw as set forth in claim 20, wherein the motor drive shaft is biased in a direction along the housing axis in a direction from the housing distal end to the housing proximal end.

22. The drill-powered reciprocating saw as set forth in claim 21, wherein both the motor driveshaft gear and the jackshaft gear comprise helical gears.

* * * * *